July 21, 1942.   J. H. RAMSEY   2,290,449
VEHICLE VENTILATING APPARATUS
Filed April 25, 1941

Joseph H. Ramsey
INVENTOR

Patented July 21, 1942

2,290,449

UNITED STATES PATENT OFFICE 2,290,449

VEHICLE VENTILATING APPARATUS

Joseph H. Ramsey, Albany, N. Y.

Application April 25, 1941, Serial No. 390,358

2 Claims. (Cl. 296—44)

This invention relates to improvements in ventilating apparatus for automobile bodies and relates more particularly to the type in common usage wherein ventilation is induced within the body by means of triangularly shaped windows pivoted about vertical axes, and usually located on either side within the front door frames and adjacent to the windshield.

While this type of ventilation is satisfactory from the standpoint of air circulation within the body it has disadvantages:

Under certain conditions of rain and wind water may be blown inwardly through the partially opened ventilator spaces, a disagreeable whistling noise is generated by the rush of air impinging upon the outwardly extended edges of the ventilator window when driving into the wind, and noises produced by the impact of the tires upon the road surface and from other external sources have unobstructed access to the interior of the body.

I have learned through experimentation and observation that by far the greater proportion of these disadvantages is provided through the V-shape opening existent between the bottom of the partially opened ventilator frame and that portion of the window sill extending rearwardly from the pivot bearing for the reason that this opening provides the only unobstructed pathway through which external noises may be conveyed directly towards the occupants of the automobile.

It is an object of this invention to provide a closure for the aforesaid V-shape opening within the normal range of ventilator adjustment for rainy weather driving and to accomplish this in such manner as to nest the parts therefor within the body of the automobile. Extending parts on the outer surface of an automobile body not only detract from its symmetry of design, but are also sources of noise in themselves as they are impinged upon by the air stream flowing along the surface of the body.

Another object is to so construct the mechanical elements of my invention that they are protected against accidental damage, and at the same time to provide, in case of a collision, protection for the passengers from injury in so far as this device is concerned.

I have attained the objects sought in a combination of elements of marked simplicity and inexpensive type, and in a manner which may be readily understood by referring to the accompanying drawing wherein—

Figure 1:
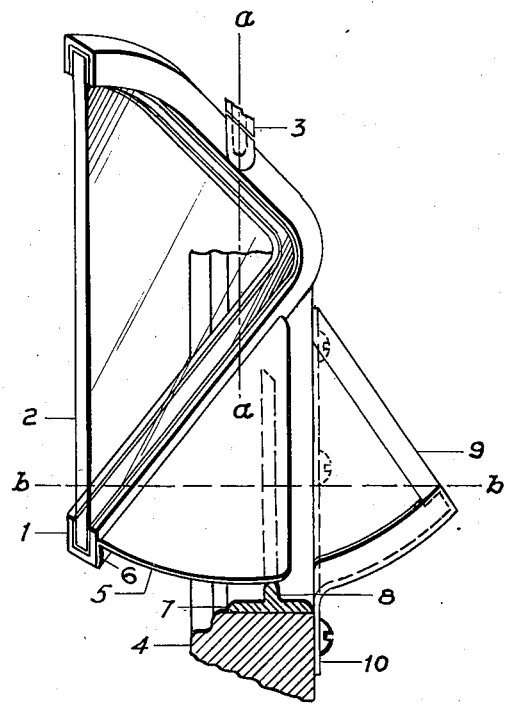
Fig. 1 illustrates a preferred embodiment of my invention in perspective as it appears when the eye of the observer is in longitudinal alignment with the left hand front window sill, and looking downwardly and forwardly, with the ventilator frame in partially opened operating position.

Referring to Fig. 1, an angular shaped metal ventilator frame 1 of conventional type, supporting a triangularly shaped pane of glass 2, is pivotally mounted about a vertical axis $a$—$a$, the upper pivot bearing 3 of which is supported by the door frame of the automobile body (not shown), and the lower pivot bearing is embedded in the window sill 4. Affixed to the rearwardly-extending lower inner surface of the ventilator frame 1, and in longitudinal alignment therewith, is a segmental shaped closure vane 5, the rearwardly extending end of which coincides with that of the ventilator frame, and the forwardly extending end reaches a point on the ventilator frame about half way between the pivot and the forwardly extending rounded nose portion of the frame 1. The vane 5 is preferably of sheet steel and is about 3½ inches at its greatest width. It is formed along its outer edge with a downwardly extending flange 6 for engagement with the ventilator frame 1 to which it is secured by weld or rivets in such manner that its plane surface is substantially at right angles to the axis $a$—$a$.

Mounted upon and affixed to the window sill 4 is a weather strip 7, preferably of rubber, having a rib 8 extending forwardly from the rear end of the sill to a point near the axis $a$—$a$, and arranged to form a water seal between the sill 4 and the under surface of the vane 5 in all angular positions of the ventilator frame 1 within the limit of the vane width. When the ventilator frame 1 is in closed position the outer face of the rib 8 will also effect a water seal with the downwardly extending flange 6 as shown sectionally in Fig. 2.

Figure 2:
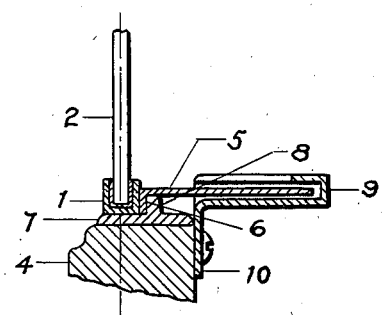
Fig. 2 is a fragmentary vertical cross-section, at $b$—$b$, of the ventilator frame and sill, and other parts to be hereinafter described, when the ventilator frame is in closed position.

With further reference to Fig. 2, it is apparent that, when the ventilator frame 1 is in the closed position shown, the inner edge of the vane 5 projects beyond the inner edge of sill 4. In order to protect the vane 5 when it is thus projected from possible accidental injury, or in case of a collision, to prevent an occupant in the car from coming in bodily contact with the projecting edge of the vane 5, I provide a guard 9 in the form of a triangularly shaped metal sheath which is fixed to the inner edge of the sill 4 by a downwardly extending flange 10. This sheath may be of molded plastic material if preferred and in either case is of such form or shape as will encase that portion of the vane 5 which projects beyond the sill 4 and thus eliminate the hazards under consideration.

It is understood that the invention is not limited to the construction herein specifically illustrated and described, but can be embodied in other forms without departure from its spirit as defined in the appended claims.

I claim:

1. In a ventilating window for vehicles; a window opening, a window pivotally supported at top and bottom within said opening, and means comprising a rigid plate attached to said window along its lower edge to effect a closure between that portion of the window extending rearwardly from its bottom pivot and the corresponding adjacent section of the window sill when the window is closed or partially open.

2. In a ventilating window for vehicles; a window opening, a window pivotally supported at top and bottom within said opening, means comprising a rigid plate attached to said window along its lower edge to effect a closure between that portion of the window extending rearwardly from its bottom pivot and the corresponding adjacent section of the window sill when the window is closed or partially open, and a guard affixed to said window sill and arranged to protect said closure means from accidental damage.

JOSEPH H. RAMSEY.